S. SHAPIRO.
MILK COOLER.
APPLICATION FILED MAR. 28, 1911.
995,727.
Patented June 20, 1911.
2 SHEETS—SHEET 1.
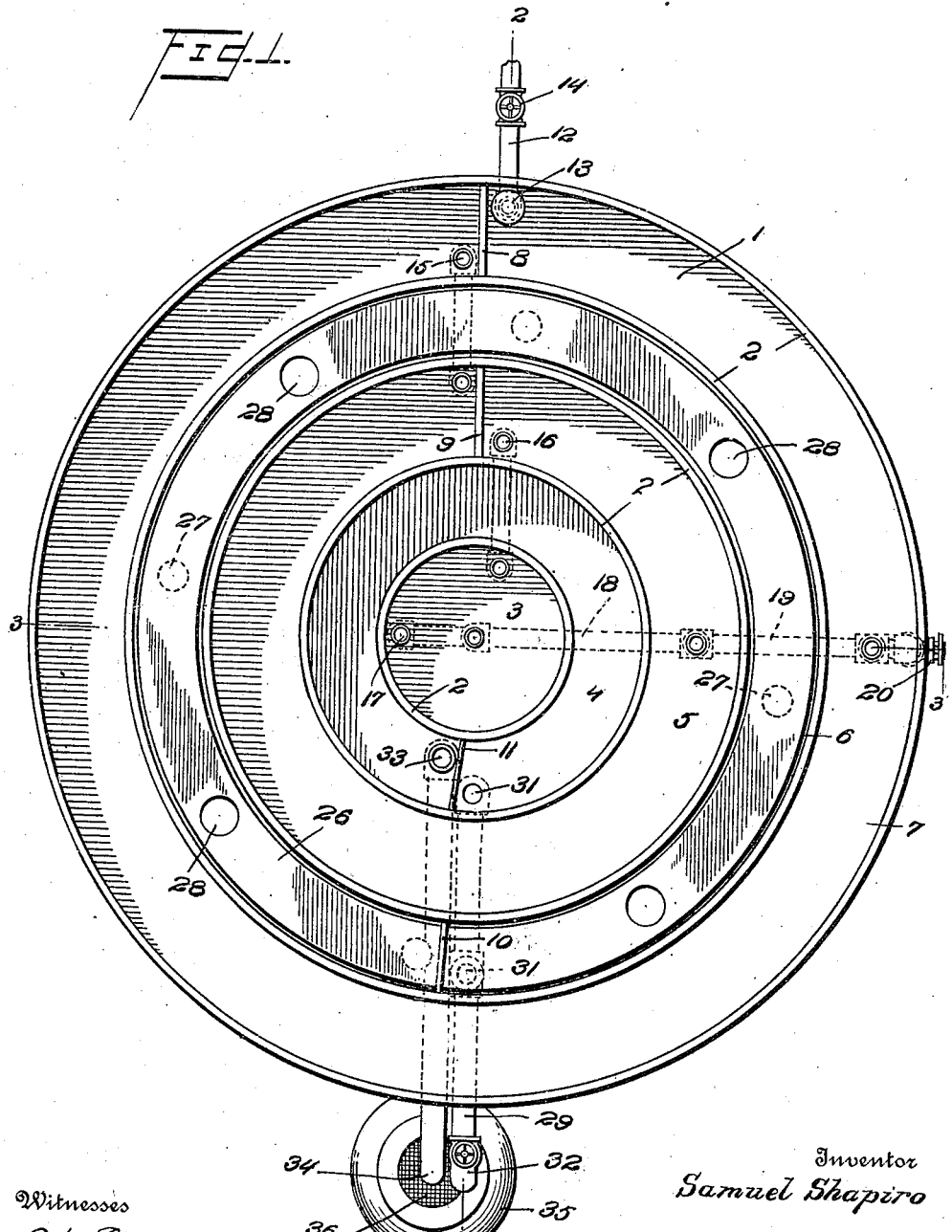
Witnesses
Inventor
Samuel Shapiro
By
Attorney

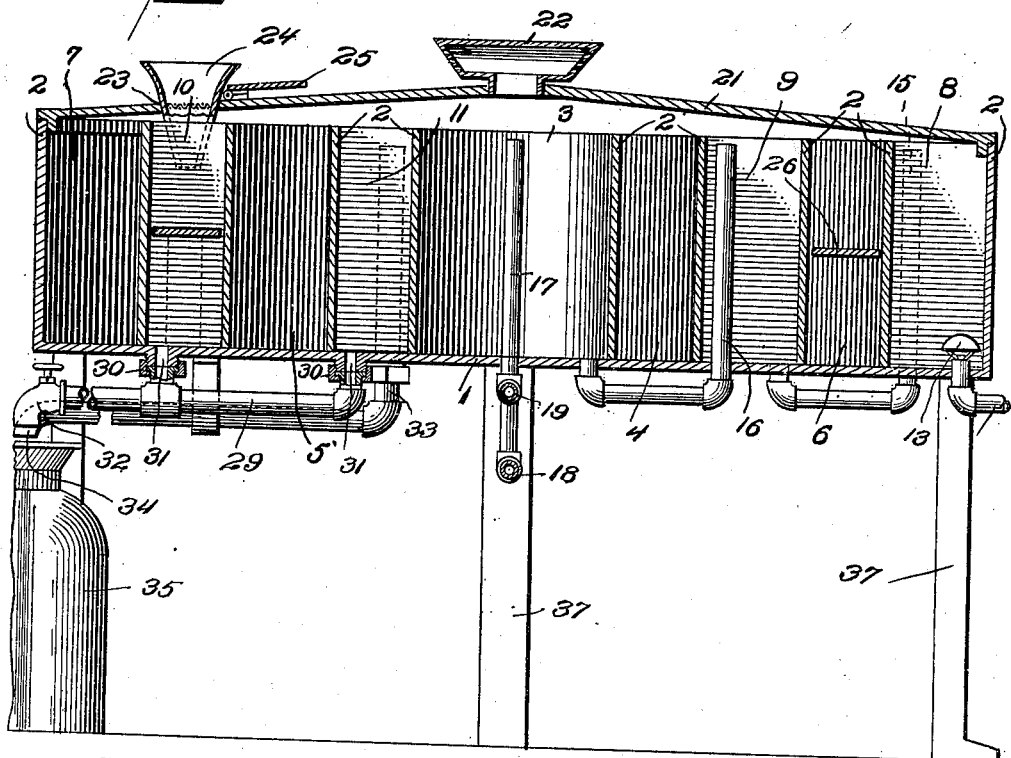

UNITED STATES PATENT OFFICE.

SAMUEL SHAPIRO, OF PHILADELPHIA, PENNSYLVANIA.

MILK-COOLER.

995,727. Specification of Letters Patent. Patented June 20, 1911.

Application filed March 28, 1911. Serial No. 617,415.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Milk-Coolers, of which the following is a specification.

My invention relates to improvements in milk coolers, the object of the invention being to provide a device of this character which will be especially adapted for use at the farm or place of milking, and adapted to promptly cool the milk before it is stored in the cans for shipment. In other words, this cooler is especially adapted to receive the buckets of milk from the milking operation and effectually cool the milk, permitting it to aerate during the cooling operation, and promptly chilling the milk so as to prevent spoiling.

A further object is to provide an improved cooler of this character of extremely simple inexpensive construction, which compels the milk to move through a circuitous path, requiring every particle of the milk to be subjected to the cooling action for the same length of time and provide an apparatus which may be perfectly cleaned when the cooling operation is over.

With these and other objects in view, the invention consists in certain novel features of construction and combinations and arrangements of parts, as will be more fully hereinafter described and pointed out in the claims.

In the accompanying drawings: Figure 1, is a plan view illustrating my improved cooler with the cover removed. Fig. 2, is a view in section on the line 2—2 of Fig. 1, and Fig. 3, is a view in section on the line 3—3 of Fig. 1.

My improved cooler comprises a bottom 1, having a plurality of concentric circular vertical walls 2 thereon forming a central circular chamber 3 and four annular chambers 4, 5, 6, and 7 respectively around the same. Chambers 3, 5, and 7, are water chambers, and are preferably wider than the second and fourth chambers 4 and 6, which are milk chambers. Water chambers 7 and 5 are provided with vertical partitions 8 and 9 respectively, and milk chambers 6 and 4 are provided with vertical partitions 10 and 11 respectively.

12 is a water supply pipe which projects up into water chamber 7 at one side of partition 8, and is provided with a shield 13 to prevent the stream of water from passing upwardly, but compel the water to distribute itself in the bottom of chamber 7. A valve 14 controls the flow of water through pipe 12, and this water flows around chamber 7 to the opposite side of partition 8. When it reaches a predetermined level in said chamber, it passes down through a pipe 15, which discharges into the bottom of chamber 5 at one side of partition 9. The water then flows around this chamber 5 to the opposite side of partition 9, and flows down through a pipe 16 into the bottom of chamber 3. Its normal outlet from chamber 3 is through a pipe 17 into a discharge pipe 18, and these several chambers 7, 5, and 3, are each connected with a drain pipe 19, which connects with pipe 18, and is provided with a cock 20 normally closed.

It will be noted that the pipes 15, 16, and 17 project up into the respective chambers at a uniform level, so that the water will be maintained in these several chambers at this level, and there will be a continuous flow in the circuitous path described from the outer to the inner chamber. A dome shaped cover 21 normally closes the cooler, and is provided centrally with a ventilator 22, which allows the animal gases in the milk to escape. This cover 21 is provided with an opening 23 above chamber 6 for the reception of a funnel shaped screen 24 through which the milk is poured into the chamber 6 at one side of partition 10. A cover 25 is provided to close the opening 23 when the screen 24 is removed. A baffle ring 26 is supported in chamber 6 on suitable posts 27, and is provided at intervals with openings 28. This baffle ring 26 acts to retard the flow of the milk, and serves to more effectually separate the colder milk below from the warmer milk above, rendering more slowly the downward passage of the milk. A pipe 29 located below the cooler is connected by pipe couplings 30 with openings 31 in the bottom chambers 4 and 6, and is provided at its discharge end with a faucet 32 normally closed. The milk which enters chamber 6 flows through this pipe 29 into chamber 4, and flows upward through said chamber as it takes the circuitous passage around the chamber by reason of the partition 11, and escapes through pipe 33, which has an outlet end 34 through which the milk flows into a can 35. This can 35 is covered by an ordinary screen 36 so that not only is the milk screened as it enters the can, but before it enters the can.

The milk which flows through the screen 24 is of course warm, and displaces the cooler milk in chamber 6 causing said cooler milk to pass through pipe 29. As the screen 24 is located at one side of partition 10, this warmer milk before it escapes through pipe 29, must pass all the way around chamber 6 and down to the lower portion of the chamber, such movement being baffled by the ring 26. The milk then flows through the pipe 29 into the bottom of chamber 4 at one side of partition 11, and flows all around said chamber to the opposite side of the partition, and rises to a point high enough to overflow through pipe 23. It will therefore be noted that all the milk which enters the funnel 24 must take the same course, and therefore must receive the same reduction of temperature before escaping. To drain the chambers 4 and 6, it is simply necessary to open faucet 32, when all the milk in these chambers will drain into the can 35. This draining operation does not take place until the entire cooling operation of the milk is ended, so that the capacity of the device is absolutely unlimited. To thoroughly clean the cooler, couplings 30 may be loosened to remove pipe 29, and this pipe may be thoroughly washed out or placed in boiling water, and access may be had to the entire interior of the cooler to thoroughly scrub and clean the same.

Ventilator 22 is so arranged that its interior may be cleaned by inserting the hand into the same from inside the cover. The cooler may be provided with suitable feet 37 or supported in any other approved manner.

While I have set forth that I use water as a cooling agent in chambers 3, 5, and 7, I would have it understood that the invention is not limited to any particular manner of imparting the necessary low degree of temperature to these chambers, as this may be done in any suitable way, and various changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A cooler comprising a plurality of concentric circular chambers, certain of said chambers constituting milk chambers, and others of said chambers constituting chambers for cooling agents, pipes connecting the bottom of said milk chambers, means for directing milk into one of said chambers, means for exhausting milk from the other of said chambers, said last-mentioned means communicating with the upper portion of said last-mentioned chamber, partitions in said milk chambers compelling milk to take a circuitous path around said chambers, substantially as described.

2. A cooler comprising a plurality of concentric circular chambers, certain of said chambers constituting milk chambers, and others of said chambers constituting chambers for cooling agents, pipes connecting the bottom of said milk chambers, means for directing milk into one of said chambers, means for exhausting milk from the other of said chambers, said last-mentioned means communicating with the upper portion of said last-mentioned chamber, and a baffle ring supported in said first-mentioned milk chamber, substantially as described.

3. A cooler comprising a plurality of concentric circular chambers, certain of said chambers constituting milk chambers, and others of said chambers constituting chambers for cooling agents, pipes connecting the bottom of said milk chambers, means for directing milk into one of said chambers, means for exhausting milk from the other of said chambers, said last-mentioned means communicating with the upper portion of said last-mentioned chamber, partitions in said milk chambers compelling milk to take a circuitous path around said chambers, and a baffle ring supported in said first-mentioned milk chamber, substantially as described.

4. In a milk cooler, the combination with a base, and five concentric vertical circular walls on said base forming a central water chamber, an outer water chamber, an intermediate water chamber, and milk chambers between said water chambers, of partitions in said milk chambers and in said outer water chambers, water pipes connecting the several water chambers and compelling a circuitous passage of water throughout the length of all of said water chambers, milk pipes connecting the milk chambers, means for directing milk into the outer of said milk chambers, and means for directing milk from the inner of said milk chambers, said milk chamber connecting means comprising a pipe connected at one end to one milk chamber, and between its ends to the other of said milk chambers, and a faucet on the outer end of said pipe, substantially as described.

5. A cooler comprising a plurality of concentric circular chambers, certain of said chambers constituting milk chambers, and others of said chambers constituting chambers for cooling agents, pipes connecting the bottom of said milk chambers, means for directing milk into one of said chambers, and means for exhausting milk from the other of said chambers, said last-mentioned means communicating with the upper portion of said last-mentioned chamber, a dome shaped cover on said cooler, a ventilator in the upper portion of said cover, and a screen receiving opening in said cover positioned above the outer of said milk chambers, and adapted to receive the milk guiding means, substantially as described.

6. A cooler comprising a plurality of concentric circular chambers, certain of said chambers constituting milk chambers, and others of said chambers constituting chambers for cooling agents, pipes connecting the bottom of said milk chambers, means for directing milk into one of said chambers, means for exhausting milk from the other of said chambers, said last-mentioned means communicating with the upper portion of said last-mentioned chamber, partitions in said milk chambers compelling milk to take a circuitous path around said chambers, a dome shaped cover on said cooler, a ventilator in the upper portion of said cover, and a screen receiving opening in said cover positioned above the outer of said milk chambers, and adapted to receive the milk guiding means, substantially as described.

7. A cooler comprising a plurality of concentric circular chambers, certain of said chambers constituting milk chambers, and others of said chambers constituting chambers for cooling agents, pipes connecting the bottom of said milk chambers, means for directing milk into one of said chambers, means for exhausting milk from the other of said chambers, said last-mentioned means communicating with the upper portion of said last-mentioned chamber, and a baffle ring supported in said first-mentioned milk chamber, a dome shaped cover on said cooler, a ventilator in the upper portion of said cover, and a screen receiving opening in said cover positioned above the outer of said milk chambers, and adapted to receive the milk guiding means, substantially as described.

8. A cooler comprising a plurality of concentric circular chambers, certain of said chambers constituting milk chambers, and others of said chambers constituting chambers for cooling agents, pipes connecting the bottom of said milk chambers, means for directing milk into one of said chambers, means for exhausting milk from the other of said chambers, said last-mentioned means communicating with the upper portion of said last-mentioned chamber, partitions in said milk chambers compelling milk to take a circuitous path around said chambers, and a baffle ring supported in said first-mentioned milk chamber, a dome shaped cover on said cooler, a ventilator in the upper portion of said cover, and a screen receiving opening in said cover positioned above the outer of said milk chambers and adapted to receive the milk guiding means, substantially as described.

9. In a milk cooler, the combination with a base, and five concentric vertical circular walls on said base forming a central water chamber, an outer water chamber, an intermediate water chamber, and milk chambers between said water chambers, of partitions in said milk chambers and in said outer water chambers, water pipes connecting the several water chambers and compelling a circuitous passage of water throughout the length of all of said water chambers, milk pipes connecting the milk chambers, means for directing milk into the outer of said milk chambers, means for directing milk from the inner of said milk chambers, said milk chamber connecting means comprising a pipe connected at one end to one milk chamber, and between its ends to the other of said milk chambers, a faucet on the outer end of said pipe, a dome shaped cover on said cooler, a ventilator in the upper portion of said cover, and a screen receiving opening in said cover positioned above the outer of said milk chambers and adapted to receive the milk guiding means, substantially as described.

In testimony whereof I have signed my name to this specification in the presence of two subscribing witnesses.

SAMUEL SHAPIRO.

Witnesses:
CHAS. E. POTTS,
R. H. KRENKEL.

---

Copies of this patent may be obtained for five cents each, by addressing the "Commissioner of Patents, Washington, D. C."